April 16, 1968  W. A. KUHN  3,377,681

METHOD OF MAKING A BEARING

Filed June 11, 1965

INVENTOR.
William A. Kuhn
BY
Barnard, McGlynn & Reising
ATTORNEYS

United States Patent Office 3,377,681
Patented Apr. 16, 1968

3,377,681
METHOD OF MAKING A BEARING
William A. Kuhn, Orange, Calif., assignor, by mesne assignments, to Lear Siegler, Inc., Santa Monica, Calif., a corporation of Delaware
Filed June 11, 1965, Ser. No. 463,123
10 Claims. (Cl. 29—149.5)

ABSTRACT OF THE DISCLOSURE

A method of making a bearing having an inner ball member and a race member conformed to the ball member and in which the race member is initially formed with a cylindrical inner surface and a circumferentially arcuately grooved outer surface. The race is deformed about the ball member in such a way that the deformation step causes the race inner cylindrical surface to conform to the surface of the ball and the circumferentially grooved outer surface to assume a cylindrical shape. The deformation may be accomplished by means of a conical swaging die, wherein the larger diameter is equal to or greater than the maximum diameter of the undeformed race member and the minimum diameter is the diameter of the desired cylindrical surface of the completed structure.

---

This invention relates to ball and socket joints of the type wherein a spherical ball is surrounded by an outer race and wherein the outer race has an inner surface conformed to the surface of the spherical ball, and more particularly to a method of manufacturing such joints.

In the design and manufacture of many machine elements, it is often desirable to provide a ball and socket joint so that one member may be permitted universal movement relative to another. A typical example of such constructions is in rod end joints commonly used in automotive suspensions.

In the formation of such ball and socket joints, a compound curved or truncated spherical ball, having a cylindrical, axial opening therein, forms one part of the joint assembly. A cylindrical race, having an inner surface conformed to the spherical surface of the ball, is disposed about the ball, thus permitting substantially universal motion of the ball within the race. A suitably formed machine element receives the ball, by means of the axial cylindrical bore, and the outer race is suitably secured in another element of the machinery so that one element may move relative to the other.

In the past, the usual method of forming such ball and socket joints has been to provide a two-part swaging die assembly, so constructed that the ball may be mounted within one of the die parts and spaced from spherical walls, so dimensioned as to receive a cylindrical outer race blank. The cylindrical blank is disposed within one of the parts of the swaging die and the second part is then forced under pressure toward the first. This causes the outer race blank to assume the spherical shape of the die cavities. In so doing, the inner surface of the outer race blank is forced inwardly to assume the shape of the spherical ball and the race is thus secured around the ball. It is then necessary to machine the outer race to provide the necessary outer cylindrical surface for securing the outer race in the machine element with which it is used. Such a process is relative expensive, due to the cost of the swaging dies and the various machining operations necessary to complete the assembly. The swaging dies must be formed to extremely close tolerances in order to provide the proper flow of metal in the outer race to conform the race to the countour of the spherical ball. Furthermore, such an assembly process is time consuming in requiring very precise location of the spherical ball within the swaging dies and assembling the outer race blank in the proper position within the swaging dies prior to the swaging operation.

It is here proposed to provide an outer race blank having a cylindrical inner surface and an outer surface that is circumferentially grooved, or arcuately concave, and an elongated swaging die that is first conical and then cylindrical. The inner surface of the outer race blank has a diameter which is substantially the same as the spherical diameter of the inner ball. The minimum outer race diameter is substantially the same as the final diameter desired of the outer race blank after it is conformed to the surface of the ball. A subassembly may be made of the outer race blank and the spherical ball, after which the subassembly is forced through the conical-cylindrical swaging die. The metal of the outer race blank on either side of the groove is forced generally radially inwardly and the metal on the inner surface of the outer race blank flows into conformity with the spherical surface of the ball. The final cylindrical diameter of the swaging die is substantially the same as the diameter desired of the outer race structure, and sufficient metal is provided on either side of the circumferential groove in the outer race blank to provide complete conformity to the spherical ball surface.

The use of an outer race structure and the conical-cylindrical swaging die above-described results in an extremely inexpensive and efficient ball and socket joint which may be rapidly assembled and formed to the desired shape and in the desired manner. The swaging die is extremely simple to manufacture and produce, and the manner in which the subassembly is forced through the swaging die is extremely simple and uncomplicated.

These and other advantages will become more apparent as the description proceeds, having reference to the following drawing in which.

Figure 1:
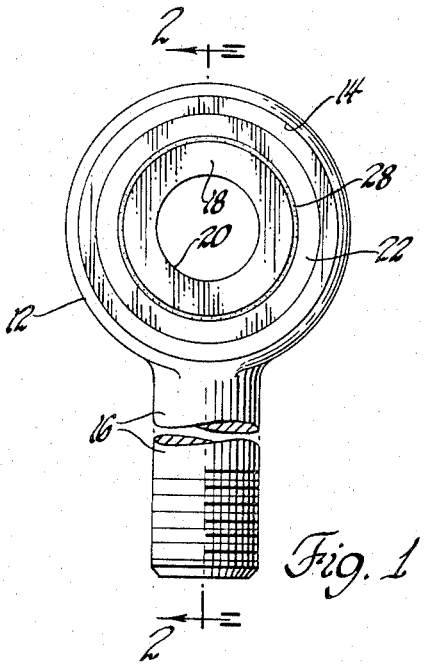
FIGURE 1 is an elevational view of a typical machine element utilizing a ball and socket joint made in accordance with the method of the invention.
Figure 2:
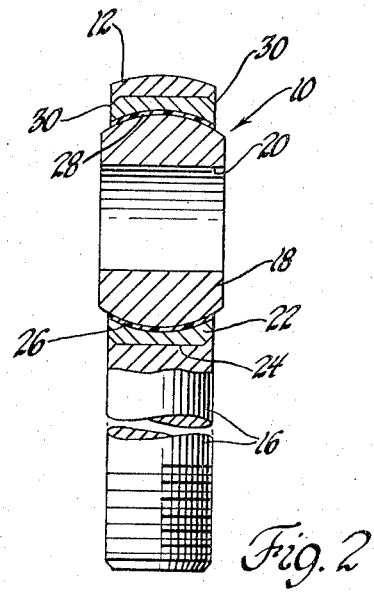
FIGURE 2 is a cross-sectional view of the structure illustrated in FIGURE 1, taken substantially along the line 2—2 of FIGURE 1, and looking in the direction of the arrows.

Referring more particularly to the drawings, FIGURES 1 and 2 best illustrate a typical machine element in which a ball and socket joint, illustrated generally by the numeral 10, may be mounted. Such machine element is shown for convenience to be a rod end coupling, which includes an outer banjo portion 12 having a central opening 14 to receive the ball and socket assembly 10. Depending from the lower portion of the banjo 12 is a threaded stud portion 16, permitting securement of the structure in some other machine element, not shown.

Ball and socket joint 10 includes a compound curved or truncated spherical ball 18 having a central axial aperture 20 to receive another machine element, not shown. Surrounding the spherical ball 18 is the outer race member 22, having an outer cylindrical surface 24 received within the opening 14 in the banjo 12 and an inner spherical surface 26 conformed to the spherical surface of ball 18, as will be hereinafter more particularly described. Disposed between the outer race member 22 and the spherical ball 18 may be a layer of low friction material 28 to provide lubricity for the ball and socket joint 10. In order to retain the ball and socket joint 10 in position within the banjo 12, the edges 30 of the banjo 12 may be spun or otherwise deformed to interfere with the edges of the outer race 22 and thus prevent longitudinal movement of the outer race relative to the banjo structure.

Figure 3:
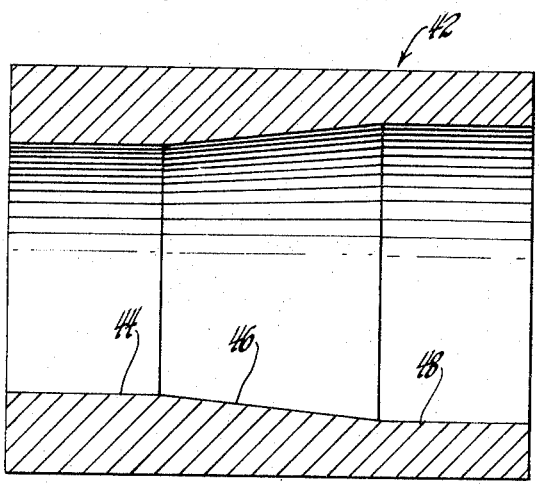
FIGURE 3 is an exploded view of the swaging die and subassembly utilized to form the ball and socket joint illustrated in FIGURES 1 and 2.
Figure 3:
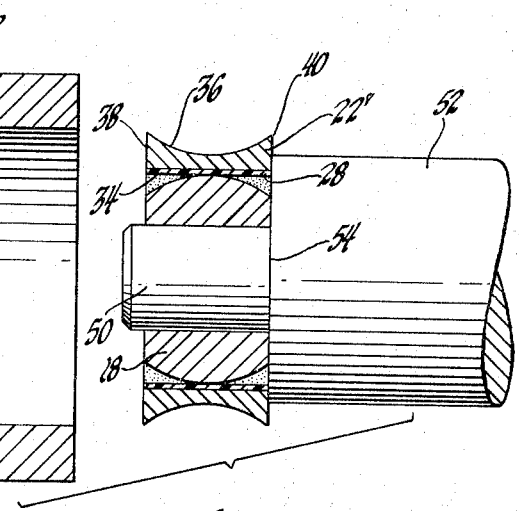

Referring now to FIGURE 3, the structure and configuration of the outer race 22 prior to deformation to conform to the surface of the spherical ball is best shown. Outer race blank 22' is shown to be provided with an axial cylindrical bore 34 and an outer surface 36 which is formed to provide a greater amount of material at the edges of the blank than at the center of the blank, this by reason of the circumferentially arcuately concave shape of the outer surface 36. It is necessary that the amount of metal adjacent the forward and rearward ends 38 and 40 of the blank 22' be greater than the amount of metal at the center of the blank 22'.

The inner cylindrical surface of the blank 22' may be provided with a layer of low friction material 28 in order to provide the necessary lubricity for the ball and socket joint upon its completion. Such low friction material may take any suitable form. However, it is preferred that such material include fibers of low friction organic polymeric material such as Teflon, and more particularly, it is preferred that the material be a Teflon cloth bonded by a phenolic resin to the inner surface of the outer race blank. Such Teflon cloth material is covered by Patents Nos. 2,885,248 and Re. 24,765 in the name of Charles S. White. At the same time, it is to be noted that such low friction material is not absolutely necessary to either the operation of or the method of forming the ball and socket joint 10, should some other lubricating means be provided. It is apparent that the diameter of the inner surface of blank 22' must be adjusted accordingly.

The swaging die, illustrated generally by the numeral 42 in FIGURE 3, includes a cylindrical section 44, having a diameter that is substantially the same as the final desired diameter of the outer race member 22. Adjacent the cylindrical section 44 is a conical section 46, the narrower end of which has a diameter substantially the same as cylindrical section 44 and which opens into the cylindrical section 44. The maximum diameter of the conical portion 46 may be any suitable dimension, so long as it is equal to or greater than the maximum diameter of the outer race blank 22' at the forward and trailing ends 38 and 40. For convenience, the die structure 42 is shown to include a second cylindrical portion 48, having a diameter which is substantially the same or slightly greater than the maximum diameter of the race blank 22'. The cylindrical portion 48 opens into the larger diameter of the conical portion 46.

Figure 4:
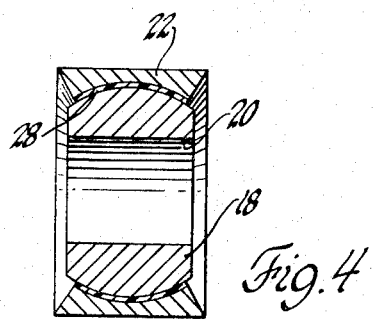
FIGURE 4 is a cross-sectional view of a ball and socket subassembly, illustrating the position of the parts and the form of the parts after passage through the swaging die illustrated in FIGURE 3.

It will now be apparent that truncated spherical ball 18 may be mounted on a locating pin or stud 50, extending from a suitable ram structure 52, and the outer race blank 22' may be disposed over the ball 18 and abutting the end face 54 of the ram 52. The inner diameter of the race blank 22' with the low friction coating, if such coating is provided, is such as to permit close fit of the race blank 22' over the spherical surface of the ball 18. The ram 52 with the subassembly of the race blank 22' and the ball 18 is forced through the swaging die 42 and completely through the three sections thereof. As the subassembly passes through the conical portion 46 of the swaging die 42, the excess of metal in the blank 22' at the forward and trailing ends 38 and 40, will deform downwardly to fill the space between the cylindrical inner surface of the blank 22' and the outer spherical surface of the ball 18. As the subassembly completely passes through the end cylindrical section 44, the result will be as illustrated in FIGURE 4, wherein the outer surface of the blank 22' is made smoothly cylindrical and the inner cylindrical surface of the blank 22' is made to conform to the spherical surface of the ball 18. A simple machining operation on the leading and trailing corners of the outer race 22 is all that is necessary to prepare the subassembly for mounting in another unit, such as the rod end coupling of FIGURES 1 and 2. Alternatively, the subassembly may be first mounted and then machined in place.

Thus, a relatively simple and inexpensive structure and method are provided for forming ball and socket assemblies for mounting in a machine element or the like. The use of a conical cylindrical swaging die assures perfect sizing of the parts on a production basis, and the entire operation may be carried out in an extremely efficient and economical manner.

Changes and modifications in the structure and method hereinbefore described will become apparent to those having skill in the art, after having had reference to the foregoing description and drawing. However, it is not intended to limit the scope of the invention by the foregoing description and drawing, but by the scope of the appended claims in which—

I claim:
1. A method of forming a bearing assembly comprising the steps of:
   forming an outer race having a cylindrical inner surface and a substantially entirely concave outer surface;
   placing said outer race on the periphery of a ball-type member having a compound curvature;
   and forcing said outer race and said ball-type member in unison through a 2-stage die to move said outer race and said ball-type member from the larger diameter to the smaller diameter to form an assembly with the inner surface of said outer race conforming to the periphery of said ball-type member and said outer surface of said outer race having a cylindrical type surface.

2. A method of forming a ball and socket type joint comprising the steps of:
   forming an outer race having a cylindrical inside surface and an outside surface that is entirely arcuate;
   placing said outer race on a portion of a ball-type member having a compound outer curvature;
   and forcing said ball-type member and outer race in unison through a swaging die going from a large diameter to a smaller diameter to complete the assembly of the ball member and outer race with a smooth cylindrical surface formed on the outside of the outer race in the area previously, continuously arcuate and with the previously cylindrical inside surface conforming to the contour of said ball-type member having compound curvature.

3. A method of forming a bearing assembly comprising the steps of:
   forming an outer race with an axially cylindrical inner surface and a circumferentially grooved outer surface forming a depression in substantially the entire outer surface;
   disposing said outer race on a member having a compound curved surface;
   and forcing said outer race and said member through a first conical and secondly cylindrical passage in a swaging die to conform the inner surface of said outer race to the compound curved surface of said member.

4. A method of forming a ball and socket joint comprising the steps of:
   forming an outer race with an axially cylindrical inner surface and a circumferential groove substantially throughout the outer surface;
   disposing said outer race on a spherical ball having an outer diameter substantially the same as the inner diameter of said race;
   and forcing said outer race and said ball through a passage in a swaging die having a cylindrical first portion with a diameter substantially the same as the maximum outer diameter of said race and a cylindrical second portion with a diameter substantially the same as the minimum outer diameter of said race and a conical portion between said first and second cylindrical portions, whereby said inner surface of said outer race is conformed to the spherical surface of said ball.

5. A method of forming a ball and socket joint comprising the steps of:
forming an outer race with an axially cylindrical inner surface and a circumferential groove substantially throughout the outer surface;
disposing a layer of low friction material on said inner surface of said race;
disposing said race and said low friction material on a spherical ball:
and forcing said ball and said outer race through a cylindrical passage in a swaging die having a diameter substantially the same as the minimum diameter of said groove in the outer surface of said race to conform the inner surface of said race and said layer of low friction material to said spherical ball.

6. The method set forth in claim 5 and further including the step of bonding said low friction material to said inner surface of said outer race.

7. The method of forming a rod end bearing comprising the steps of:
forming an outer race with an axially cylindrical inner surface and a circumferential groove substantially throughout the outer surface;
disposing said race on a spherical ball;
forcing said outer race and said ball through a passage in a swaging die having a first cylindrical portion, a conical portion with a larger diameter substantially the same as the maximum outer diameter of said race and a second cylindrical portion with a diameter substantially the same as the minimum outer diameter of said race to conform the inner surface of said race to said spherical ball;
mounting said race and said ball in a rod end banjo; and deforming the surfaces of said banjo adjacent said race to prevent movement of said race relative to said banjo.

8. The method set forth in claim 7 and further including the step of disposing a layer of low friction material between said outer race and said ball.

9. The method set forth in claim 8 and further including the step of bonding said low friction material to said inner surface of said race.

10. A method of forming a ball and socket joint comprising the steps of:
forming an outer race with a cylindrical inner surface and a circumferentially inwardly substantially entirely arcuate outer surface;
disposing said outer race on a ball;
and deforming said outer race to conform the inner surface thereof to the surface of said ball, said deformation at the same time forming a cylindrical outer surface on said race.

References Cited
UNITED STATES PATENTS

| | | | |
|---|---|---|---|
| 2,995,813 | 8/1961 | Board | 29—441 |
| 3,049,800 | 8/1962 | Neff et al. | 29—441 |
| 3,068,552 | 12/1962 | Williams et al. | 29—149.9 |
| 3,126,613 | 3/1964 | Litsky | 308—72 X |
| 3,191,265 | 6/1965 | McCloskey | 29—149.5 |
| 3,303,557 | 2/1967 | Litsky | 29—149.5 |

THOMAS H. EAGER, *Primary Examiner.*
CHARLIE T. MOON, *Examiner.*